(12) United States Patent
Padden et al.

(10) Patent No.: US 11,057,957 B2
(45) Date of Patent: Jul. 6, 2021

(54) SYSTEMS AND METHODS FOR JOINT WIRELESS TRANSMISSION AND JOINT WIRELESS RECEPTION

(71) Applicant: CABLE TELEVISION LABORATORIES, INC., Louisville, CO (US)

(72) Inventors: Joseph Padden, Boulder, CO (US); Mark J. Poletti, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 19 days.

(21) Appl. No.: 16/597,569

(22) Filed: Oct. 9, 2019

(65) Prior Publication Data
US 2020/0113005 A1 Apr. 9, 2020

Related U.S. Application Data

(60) Provisional application No. 62/743,041, filed on Oct. 9, 2018.

(51) Int. Cl.
| | |
|---|---|
| *H04W 76/15* | (2018.01) |
| *H04W 4/80* | (2018.01) |
| *H04W 56/00* | (2009.01) |
| *H04W 84/20* | (2009.01) |

(52) U.S. Cl.
CPC ............. *H04W 76/15* (2018.02); *H04W 4/80* (2018.02); *H04W 56/0015* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 2013/0329711 A1* | 12/2013 | Seo | H04W 72/0406 370/336 |
| 2015/0288427 A1* | 10/2015 | Wang | H04W 72/1284 370/329 |
| 2016/0081082 A1* | 3/2016 | Cao | H04B 7/024 370/329 |
| 2016/0174217 A1* | 6/2016 | Salem | H04W 72/04 455/454 |
| 2018/0167903 A1* | 6/2018 | Fan | H04L 25/0204 |
| 2018/0255611 A1* | 9/2018 | Li | H04W 92/18 |
| 2018/0335545 A1* | 11/2018 | Dalthorp | G01V 11/002 |
| 2018/0338233 A1* | 11/2018 | Cariou | H04W 4/80 |
| 2019/0319686 A1* | 10/2019 | Chen, IV | H04B 7/0639 |
| 2019/0350023 A1* | 11/2019 | Novlan | H04L 5/16 |

* cited by examiner

*Primary Examiner* — Anh Vu H Ly
(74) *Attorney, Agent, or Firm* — PdZ Patent Law, PLLC

(57) ABSTRACT

A method for joint wireless transmission includes (a) at a master wireless communication device, generating a first coordination signal for coordinating joint transmission of a wireless communication signal by at least the master wireless communication device and a first slave wireless communication device, (b) transmitting the first coordination signal from the master wireless communication device to the first slave wireless communication device, and (c) transmitting a first portion of the wireless communication signal from the master wireless communication device to a wireless base station that is remote from each of the master wireless communication device and the first slave wireless communication device.

12 Claims, 11 Drawing Sheets

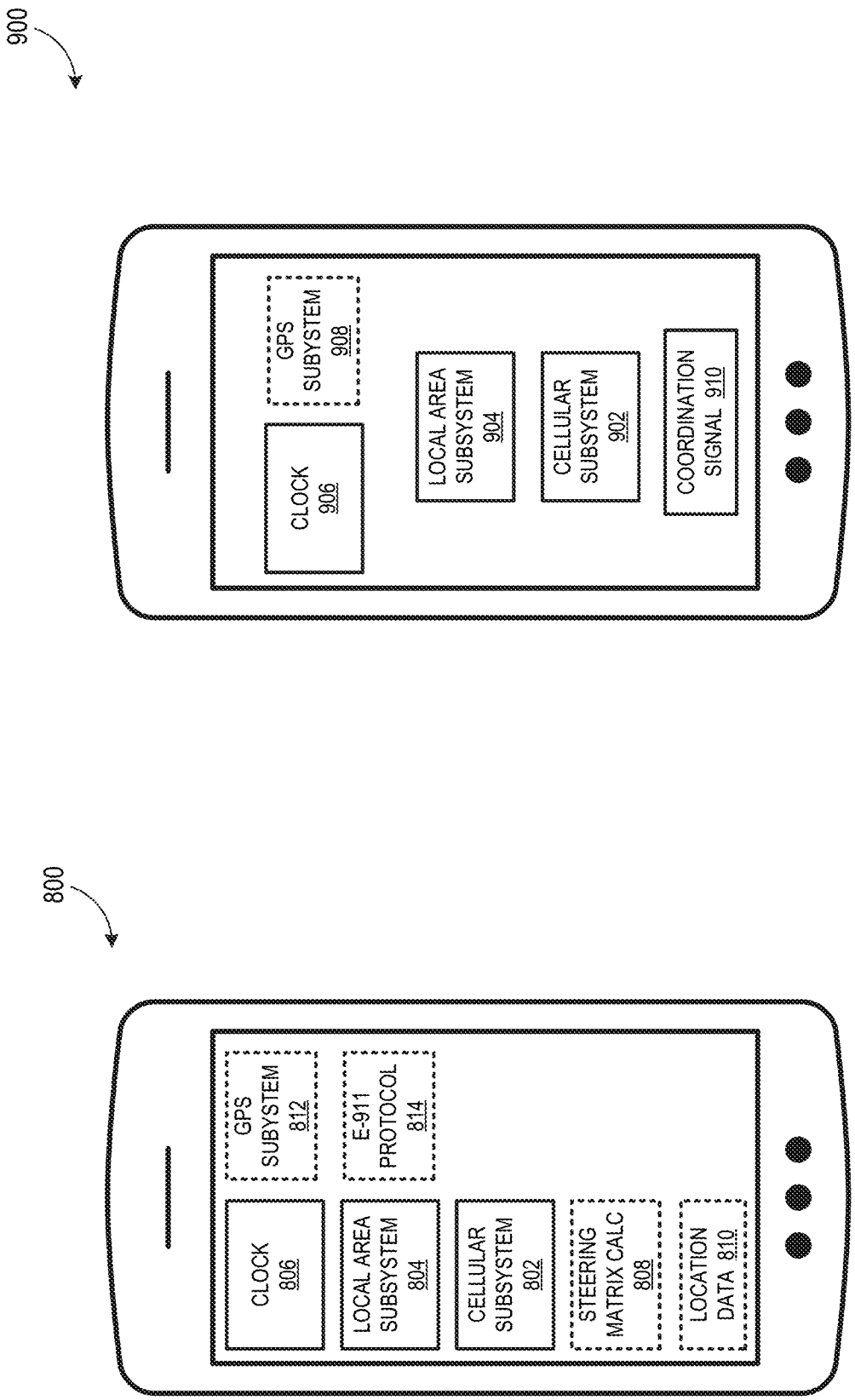

SYSTEMS AND METHODS FOR JOINT WIRELESS TRANSMISSION AND JOINT WIRELESS RECEPTION

RELATED APPLICATIONS

This application claims benefit of priority to U.S. Provisional Patent Application Ser. No. 62/743,041, filed on Oct. 9, 2018, which is incorporated herein by reference.

BACKGROUND

Wireless communication devices, such as mobile phones, are typically capable of transmitting and receiving wireless communication signals for two-way communication. For example, a mobile phone receives wireless communication signals from a wireless base station, and the mobile phone transmits wireless communication signals to the wireless base station. The wireless base station ordinarily has a higher maximum transmission power than the mobile phone. One reason for this maximum transmission power disparity is that a mobile telephone must limit its transmission power to prevent a user from receiving excessive radiation. Additionally, size constraints and energy availability constraints may limit maximum power transmission in a mobile phone.

BRIEF DESCRIPTION OF THE DRAWINGS

FIG. 8 is a block diagram of a master wireless communication device, according to an embodiment.

FIG. 9 is a block diagram of a slave wireless communication device, according to an embodiment.

DETAILED DESCRIPTION OF THE EMBODIMENTS

Figure 1:
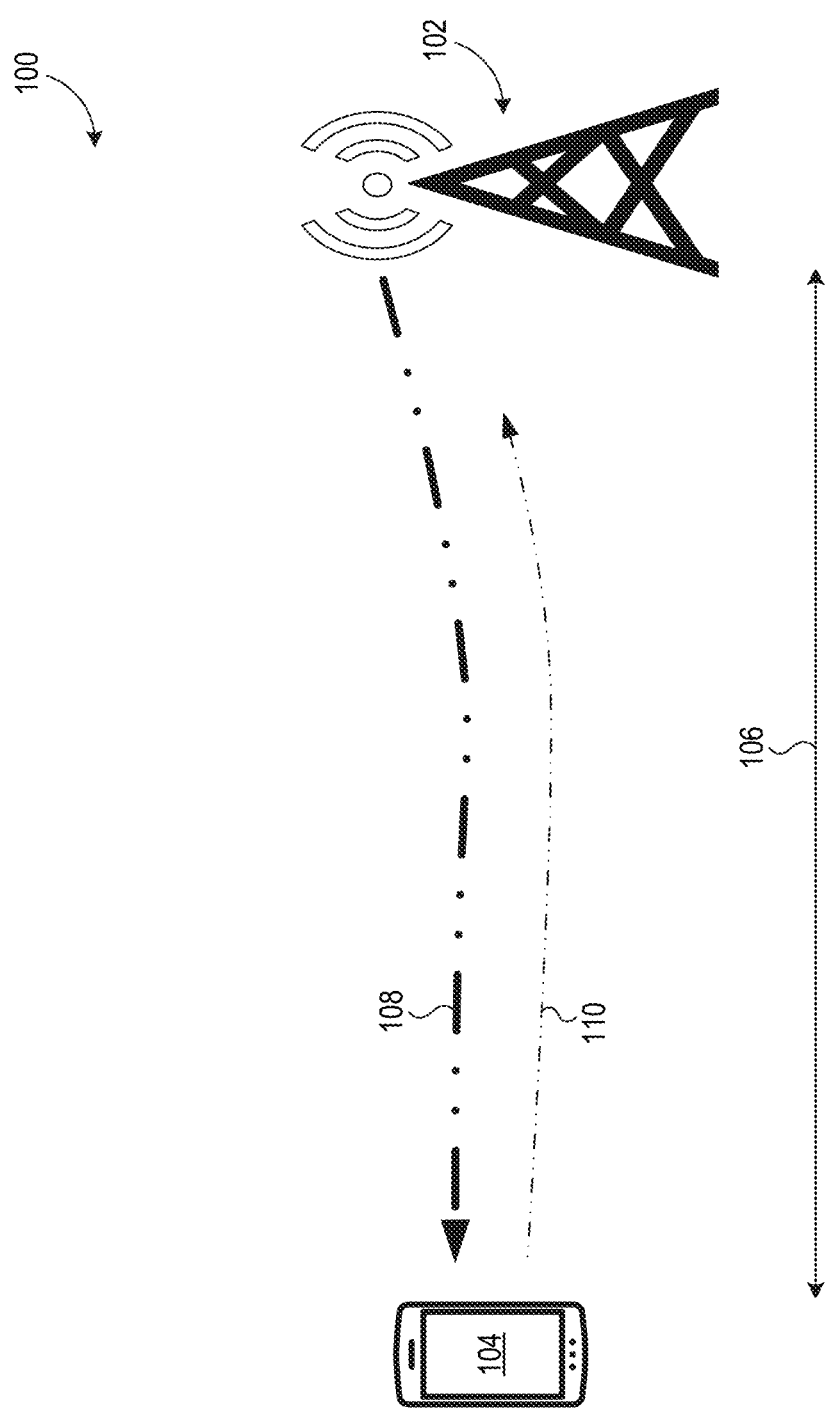
FIG. 1 is schematic diagram illustrating a wireless communication system including a wireless communication device located a significant distance from a wireless base station.

As discussed above, a wireless base station ordinarily has a higher maximum transmission power than a wireless communication device, such as a mobile phone. Consequently, if a wireless communication device is near an edge of a wireless base station's coverage area, the wireless communication device may be able to receive wireless communication signals from the wireless base station, but the wireless communication device may be unable to transmit wireless communication signals to the wireless base station. For example, FIG. 1 is a schematic diagram of a wireless communication system 100 including a wireless base station 102 and a wireless communication device 104, where wireless communication device 104 is located a relatively long distance 106 away from wireless base station 102. Wireless base station 102 has a relatively high maximum transmission power, and wireless base station 102 is therefore capable of transmitting wireless communication signals 108 at a sufficiently-high power such that wireless communication device 104 receives wireless communication signals 108. Wireless communication device 104, however, has a significantly lower maximum transmission power, and wireless communication device 104 is therefore unable to transmit wireless communication signals 110 at sufficiently-high power for wireless base station 102 to receive wireless communication signals 110, as symbolically shown in FIG. 1 by wireless communication signals 110 not reaching wireless base station 102. Therefore, wireless communication device 104 can receive data from wireless base station 102, but wireless communication device 104 cannot transmit data to wireless base station 102.

Applicant has determined that the above-discussed problem can be at least partially overcome by leveraging a combined transmission power of a plurality of wireless communication devices in a local area, to jointly transmit a wireless communication signal to a remote device, such as a wireless base station. For example, although a single wireless communication device may lack sufficient transmission power to transmit a wireless communication signal to a distant wireless base station, two wireless communication devices may collectively have sufficient transmission power to successfully transmit the wireless communication signal to the wireless base station. Indeed, in some cases, transmission power may increase by a base power law for each additional wireless communication device used to jointly transmit a wireless communication signal. For example, use of two wireless communication devices, instead of one wireless communication device, to transmit a wireless communication signal may increase signal strength by three decibels, use of four wireless communication devices, instead of one wireless communication device, to transmit a wireless communication signal may increase signal strength by six decibels, and so on. Additionally, Applicant has found that significant advantages can be achieved by using a plurality of wireless communication devices to receive a given wireless communication signal from a wireless base station.

Disclosed herein are systems and methods for joint wireless transmission and joint wireless reception. In some embodiments, a master wireless communication device coordinates joint transmission of a wireless communication signal by two or more wireless communication devices, e.g. by a master wireless communication device and one or more slave wireless communication devices, such that respective portions of the wireless communication signal from each wireless communication device constructively interfere with each other at the receiver. Additionally, in some embodiments, a master wireless communication device coordinates reception of a wireless communication signal by two or more wireless communication devices, e.g. by a master wireless communication device and one or more slave wireless communication devices.

Figure 2:
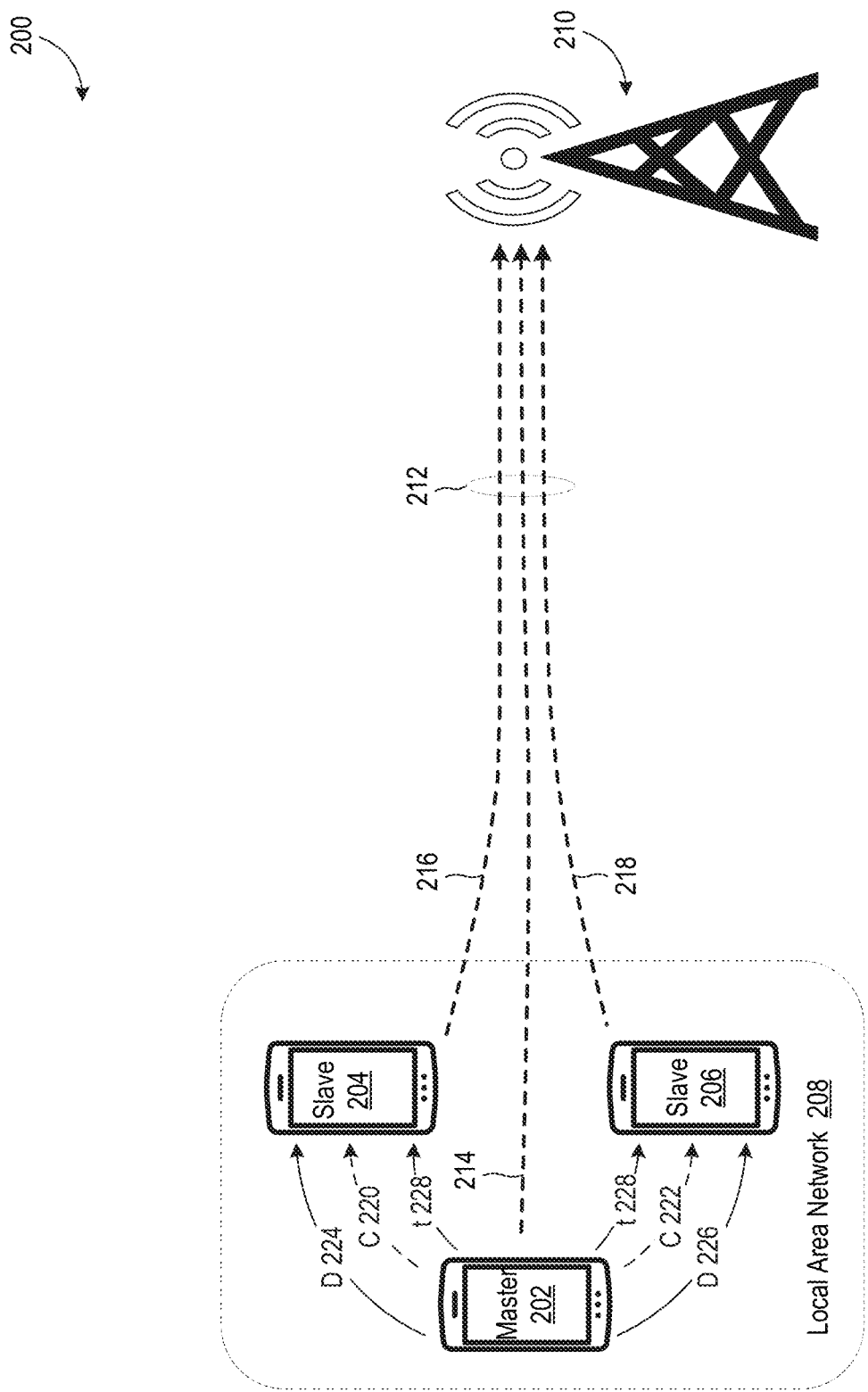
FIG. 2 is a schematic diagram of a wireless communication system configured for joint wireless transmission, according to an embodiment.
Figure 3:
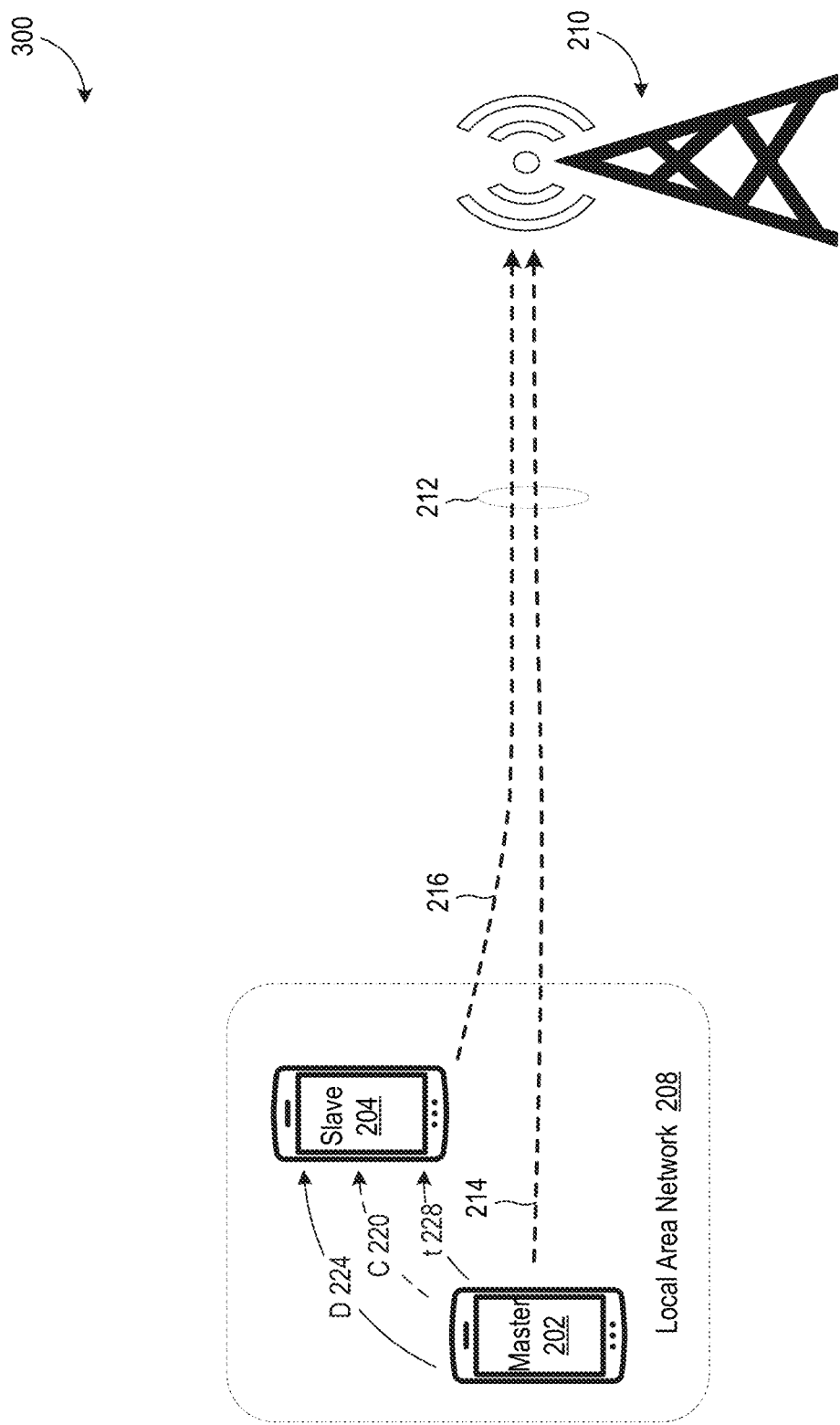
FIG. 3 is a schematic diagram of another wireless communication system configured for joint wireless transmission, according to an embodiment

FIG. 2 is a schematic diagram of a wireless communication system 200 configured for joint wireless transmission. System 200 includes wireless communication devices 202, 204, and 206 in a local area network 208, and system 200 further includes a wireless base station 210 that is remote from each of wireless communication devices 202, 204, and 206. In the example of FIG. 2, wireless communication device 202 is configured as a master wireless communication device, and each of wireless communication devices 204 and 206 is configured as a slave wireless communication device. In some embodiments, master wireless communication device 202 creates local area network 208, and slave wireless communication devices 204 and 206 join local area network 208. Local area network 208 can include a different number of wireless communication devices without departing from the scope hereof, but local area network 208 must include at least two wireless communication devices to enable joint wireless transmission. For example, FIG. 3 is a schematic diagram of a wireless communication system 300 which is similar to wireless communication system 200 of FIG. 2, but where local area network 208 includes only two wireless communication devices.

Figure 4:
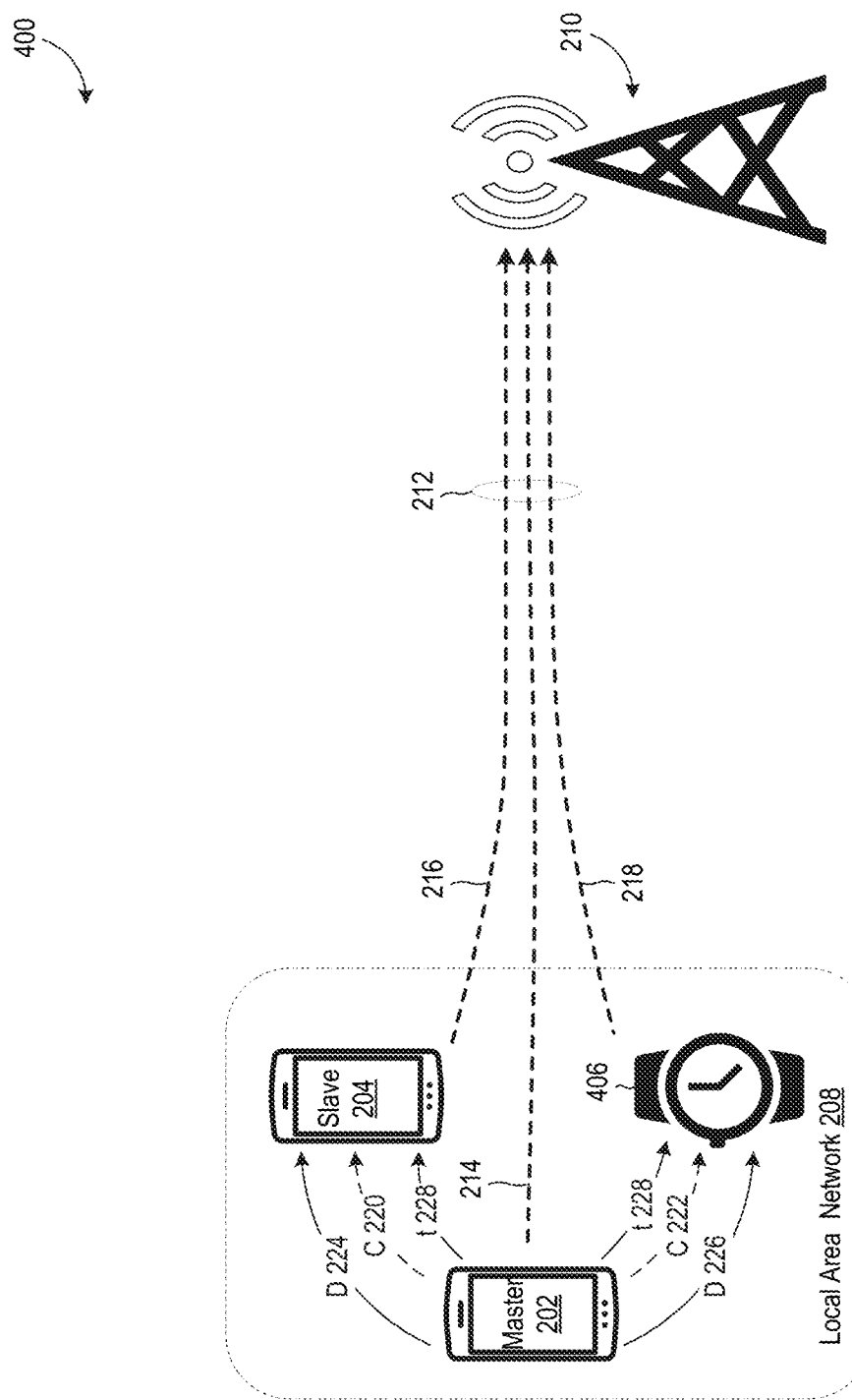
FIG. 4 is a schematic diagram of an alternate embodiment of the FIG. 2 wireless communication system including a wearable device with wireless capability.

Although each wireless communication device 202, 204, and 206 of local area network 208 is depicted in FIG. 2 as a mobile phone, one or more of the wireless communication devices could take a different form. For example, in an alternate embodiment (not shown), one or more of wireless communication devices 202, 204, and 206 is replaced by a computer, a set-top device, a data storage device, an Internet of Things (IoT) device, an entertainment device, a computer networking device, a smartwatch, a wearable device with wireless capability, or a medical device, etc. Additionally, wireless communication devices of local area network 208 need not all take the same form. For example, FIG. 4 is a schematic diagram of a wireless communication system 400, which is like wireless communication system 200 but with wireless communication device 206 replaced with a wearable device (watch) 406 having wireless capability and configured as a slave wireless communication device.

Referring again to FIG. 2, in certain embodiments, wireless base station 210 includes an evolved NodeB (eNB), a next generation NodeB (gNB), an Institute of Electrical and Electronics Engineers (IEEE) 802.11-based wireless access point, an Integrated Access and Backhaul (IAB) access point, a microcell, a picocell, a femtocell, a macrocell, or an IEEE 802.11-based application, etc. However, wireless base station 210 can take other forms without departing from the scope hereof.

Master wireless communication device 202 is configured to control slave wireless communication devices 204 and 206 to coordinate joint transmission of a wireless communication signal 212 from the wireless communication devices of local area network 208 to wireless base station 210. Wireless communication signal 212 includes a first portion 214 transmitted by master wireless communication device 202, a second portion 216 transmitted by slave wireless communication device 204, and a third portion 206 transmitted by slave wireless communication device 206. In some embodiments, master wireless communication device 202 is configured to control slave wireless communication devices 204 and 206 such that first portion 214, second portion 216, and third portion 218 constructively interfere with each other at a receiver of wireless base station 210, to increase likelihood of wireless communication signal 212 being successfully received by wireless base station 210. Accordingly, joint transmission of wireless communication signal 212 by each wireless communication device of local area network 208 may enable data transmission from local area network 208 to wireless base station 210 that would not be possible by independent operation of any one of wireless communication devices 202, 204, and 206. Additionally, even if a single wireless communication device can independently transmit a wireless communication signal to wireless base station 210, joint wireless transmission may offer one or more advantages over independent wireless transmission, such as reduced power consumption by a given wireless communication device and/or increased wireless communication reliability.

The number of portions of wireless communication signal 212 varies according to the number of wireless communication devices of local area network 208. For example, if local area network 208 includes an additional slave wireless communication device (not shown), wireless communication signal 212 will include a fourth portion (not shown), in addition to first, second, and third portions 214, 216, and 218, and master wireless communication 202 may cause these four portions to constructively interfere with each other at an intended receiver. As another example, if local area network 208 includes only two slave wireless communication devices, such as illustrated in FIG. 3, wireless communication signal 212 will include only first and second portions 214 and 216, and master wireless communication 202 may cause these two portions to constructively interfere with each other at an intended receiver. Additionally, in some cases, one or more wireless communication devices of local area network 208 may not participate in joint transmission of wireless communication signal 212, and in such case, wireless communication signal 212 would not include portions associated with the non-participating wireless communication devices. For example, if slave wireless communication device 206 were to not participate in joint transmission of wireless communication signal 212, wireless communication signal 212 would consist of only first portion 214 and second portion 216.

Master wireless communication device 202 controls joint wireless communication signal transmission of slave wireless communication devices 202, 204, and 206, for example, at least in part by generating a respective coordination signal for each slave wireless communication device and transmitting the coordination signal to the slave wireless communication device. For example, FIG. 2 illustrates master wireless communication device 202 transmitting (a) a coordination signal 220 to slave wireless communication device 204 and (b) a coordination signal 222 to slave wireless communication device 206. Coordination signals are labeled as "C" in FIG. 2. Each coordination signal specifies one or more parameters for coordinating joint transmission of wireless communication signal 212. For example, coordination signal 220 specifies one or more parameters associated with portion 216 of wireless communication signal 212, and coordination signal 222 specifies one or more parameters associated with portion 218 of wireless communication signal 212. Examples of possible parameters specified by a coordination signal include, but are not limited to, one or more of (a) phase of a wireless communication signal portion, (b) amplitude of a wireless communication signal portion, and (c) a transmission offset time. A transmission offset time is a difference between transmission times of two wireless communication devices. In some embodiments, a coordination signal directly specifies parameters for coordinating joint transmission of wireless communication signal 212. In some other embodiments, a coordination signal indirectly specifies parameters for coordinating joint transmission of wireless communication signal 212 by specifying one or more codebook values, where each codebook values corresponds to one or more parameters.

Figure 6:
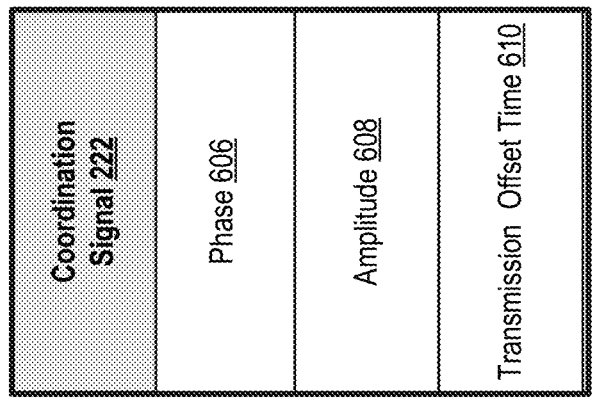
FIG. 6 is a schematic diagram illustrating another coordination signal, according to an embodiment.
Figure 5:
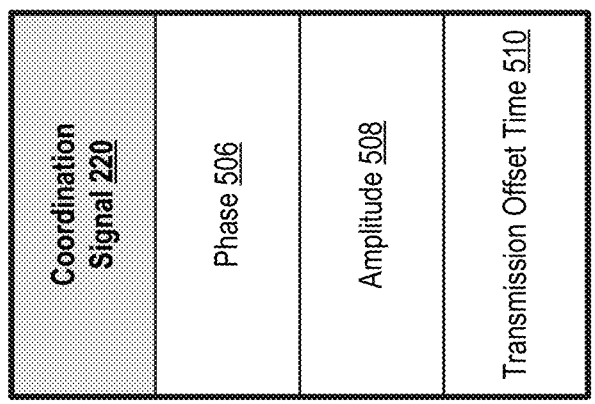
FIG. 5 is a schematic diagram illustrating one coordination signal, according to an embodiment.

FIGS. 5 and 6 are schematic diagrams illustrating one embodiment of each of coordination signals 220 and 222, respectively. Coordination signal 220 specifies a phase 506 of second portion 216, an amplitude 508 of second portion 216, and a transmission offset time 510 of second portion. Similarly, coordination signal 222 specifies a phase 606 of third portion 218, an amplitude of 608 of third portion 218, and a transmission offset time 616. Transmission offset time 510 is, for example, a difference between (a) a time when master wireless communication device 202 begins to transmit first portion 214 and (b) a time when slave wireless communication device 204 begins to transmit second portion 216. Transmission offset time 610 is, for example, a difference between (a) a time when master wireless communication device 202 begins to transmit first portion 214 and (b) a time when slave wireless communication device 206 begins to transmit third portion 218. Coordination signals 220 and 222 could be modified to specify fewer parameters, additional parameters, or alternative parameters, without departing from the scope hereof. For example, in certain alternate embodiments, phase 506 and amplitude 508 are omitted from coordination signal 220, and phase 606 and amplitude 608 are omitted from coordination signal 222. As another example, in certain other alternate embodiments, coordination signal 220 specifies a first codebook value corresponding to each of phase 506, amplitude 508, and transmission offset time 510, and coordination signal 222 specifies a second codebook value corresponding to each of phase 606, amplitude 608, and transmission offset time 610.

In certain embodiments, master wireless communication device 202 generates coordination signals, e.g. coordination signals 220 and 222, in a manner that causes the portions of wireless communication signal 212 to constructively interfere with each other at an intended receiver, e.g. at a receiver of wireless base station 210. For example, in an embodiment, master wireless communication device 202 generates phase 506, amplitude 508, transmission offset time 510, phase 606, amplitude 608, and transmission offset time 610 such that first, second, and third portions 214, 216, and 218 of wireless communication signal 212 constructively interfere with each other at a receiver of wireless base station 210, thereby increasing ability of local area network 208 to transmit a wireless communication signal to wireless base station 210. In some embodiments, master wireless communication device 202 generates coordination signals based in part on locations of wireless communication devices, e.g. locations wireless communication devices 202, 204, and 206, in local area network 208, such as by using a steering matrix, so that the portions of wireless communication signal 212 constructively interfere with other at a receiver of wireless base station 210. The steering matrix determines, for example, phase, amplitude, and transmission offset time of each wireless communication signal 212 portion based on locations of the wireless communication devices. In some embodiments, master wireless communication device 202 is configured to update coordination signals 220 and 222 on a regular basis and/or in response to a change in system 200, such as in response to a change in location of one or more wireless communication devices of local area network 208.

The locations of wireless communication devices in local area network 208 used to determine coordination signals 220 and 222 are, for example, actual locations of the wireless communication devices or relative locations of the wireless communication devices. For example, in some embodiments, slave wireless communication devices 204 and 206 determine their respective locations, such as through triangulation of global navigation satellite system (GNSS) signals or wireless base station signals, and slave wireless communication devices 204 and 206 transmit their respective locations to master wireless communication device 202. As another example, in some embodiments, master wireless communication device 202 determines relative locations of slave wireless communication devices 204 and 206, e.g. locations of slave wireless communication devices 204 and 206 relative to master wireless communication device 202, based on time required for wireless communication signals to be transmitted between master wireless communication device 202 and slave wireless communication devices 204 and 206.

Wireless communication devices 202, 204, and 206 may need to be synchronized in time, e.g. synchronized to a common clock, to enable the wireless communication devices to transmit their respective portions 214, 216, and 218 of wireless communication signal 212 at appropriate times, to achieve constructive interference of portions 214, 216, and 218 with each other at an intended receiver. Therefore, in some embodiments, a respective clock of each wireless communication device 202, 204, and 206 is synchronized from a common source, such as wireless base station 210 and/or a global positioning system. In other embodiments, master wireless communication device 202 transmits a synchronization signal (not shown) to each of slave wireless communication device 204 and 206, to synchronize respective clocks of slave wireless communication devices 204 and 206 with a clock of master wireless communication device 202. Master wireless communication device 202 generates the synchronization signal, for example, based on its clock or based on a signal that wireless communication device 202 receives from an external source, such as wireless base station 210 and/or a global positioning system.

Data is transmitted from local area network 208 to wireless base station 210 via one or more portions 214, 216, and 218 of wireless communication signal 212. In some embodiments, each wireless communication device 202, 204, and 206 generates its own data for transmission to wireless base station 210. In other embodiment, one or more wireless communication devices 202, 204, and 206 generates data for two or more other wireless communication devices 202, 204, and 206 to transmit to wireless base station 210. For example, FIG. 2 illustrates master wireless communication device transmitting data (D) 224 and 226 to slave wireless communication devices 204 and 206, respectively. In this example, slave wireless communication device 204 transmits data 224 to wireless base station 210 via second portion 216 of wireless communication signal 212, and slave wireless communication device 206 transmits data 226 to wireless base station 210 via third portion 218 of wireless communication signal 212. In some embodiments, data 224 is the same as data 226, such that common data is transmitted to wireless base station 210 via both second and third portions 216 and 218 of wireless communication signal 212. In some other embodiments, data 224 is different from data 226, such that different data is transmitted to wireless base station 210 via both second and third portions 216 and 218 of wireless communication signal 212.

Additionally, in some embodiments, master wireless communication device 202 sends transmit time (t) 228 to each slave wireless communication device 204 and 206, where transmit time 228 specifies when the wireless communication devices of local area network 208 will transmit wireless communication signal 212 to wireless base station 210. In these embodiments, each slave wireless communication device transmits it respective portion of wireless communication signal 212 at time 228, as adjusted according to a respective transmission offset time specified in a coordination signal. For example, in one embodiment, slave wireless communication device 204 transmits portion 216 at time 228 as adjusted according to transmission offset time 510, and slave wireless communication device 206 transmits portion 218 at time 228 as adjusted according to transmission offset time 610. A transmission offset time, e.g. transmission offset time 510 or 610, could be positive or negative, and each slave wireless communication device could therefore transmit its respective portion of wireless communication signal 212 either before time 228 or after time 228, depending on the polarity of its respective transmission offset time.

Figure 7:
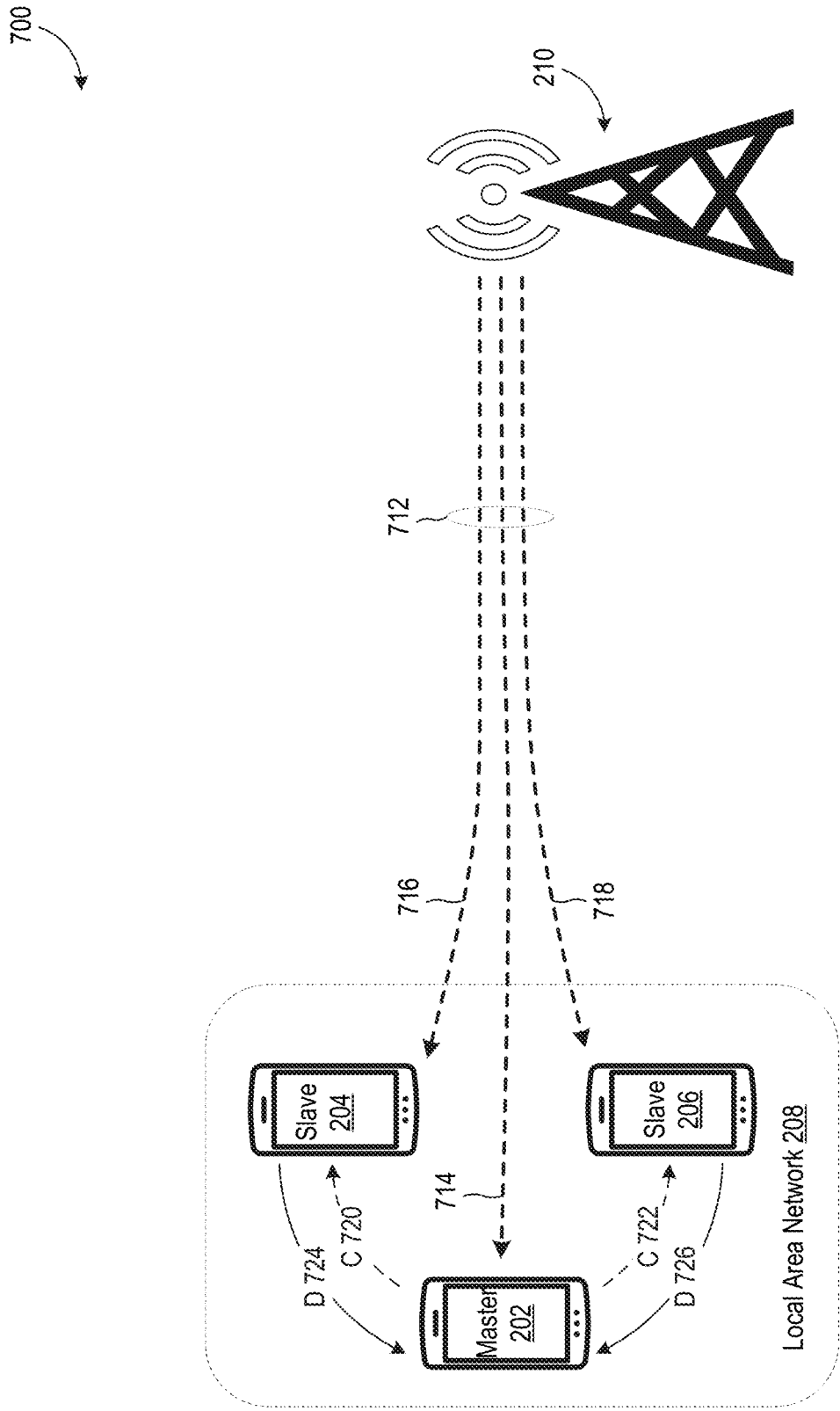
FIG. 7 is a schematic diagram of a wireless communication system configured for joint wireless reception, according to an embodiment.

Although FIGS. 2-4 do not show wireless communication devices 202, 204, and 206 receiving a wireless communication signal from wireless base station 210 for illustrative simplicity, in some embodiments, wireless communication devices 202, 204, and 206 are configured to receive wireless communication signals from wireless base station 210. For example, FIG. 7 is a schematic diagram illustrating a wireless communication system 700, which is an embodiment of wireless communication system 200 where wireless communication devices 202, 204, and 206 of local area network 208 are configured to jointly receive a wireless communication signal 712 from wireless base station 210. In some embodiments, wireless communication system 700 is also configured to jointly transmit a wireless communication signal, such as using the joint transmission techniques discussed above with respect to system 200.

Master wireless communication device 202 is configured to receive a first portion 714 of wireless communication signal 712, slave wireless communication device 204 is configured to receive a second portion 716 of wireless communication signal 712, and slave wireless communication device 206 is configured to receive a third portion 718 of wireless communication signal 712. Slave wireless communication device 204 is configured to transmit to master wireless communication device 202 data 724 associated with second portion 716, and slave wireless communication device 206 is configured to transmit to master wireless communication device 202 data 726 associated with third portion 718. Master wireless communication device 202 is, for example, configured to combine data 724 and data 726 with data (not shown) associated with first portion 714, to generate a signal representing all data of wireless communication signal 712.

Master wireless communication device 202 controls wireless signal reception by slave wireless communication devices 204 and 206, for example, by generating a respective coordination signal for each slave wireless communication device and transmitting the coordination signal to the slave wireless communication device. For example, FIG. 7 illustrates master wireless communication device 202 transmitting (a) a coordination signal 720 to slave wireless communication device 204 and (b) a coordination signal 722 to slave wireless communication device 206. Each coordination signal 720 and 722 specifies one or more aspects of how a respective slave wireless communication device should receive wireless communication signal 712, to coordinate joint reception of a wireless communication signal. For example, coordination signal 720 specifies one or more aspects of how slave wireless communication device 204 should receive wireless communication signal 712, and coordination signal 722 specifies one or more aspects of how slave wireless communication device 206 should receive wireless communication signal 712. In some embodiments, each coordination signal 720 and 722 specifies a respective antenna directional characteristic, such that antennas of slave wireless communication devices 204 and 206 are oriented at different respective directions. As another example, in some embodiments, each coordination signal 720 and 722 specifies a respective antenna gain characteristic, such that antennas of slave wireless communication device 204 and 206 have different respective gains. Master wireless communication device 202 generates coordination signals 720 and 722, for example, to maximize collective reception of wireless communication signal 712 by the wireless communication devices of local area network 208.

Referring generally to the wireless communication systems of FIGS. 2-4 and 7, in certain embodiments, different wireless communication protocols are used for (a) communication among wireless communication devices in local area network 208 and (b) communication between the wireless communication devices in local area network 208 and wireless base station 210. For example, in some embodiments, (a) wireless communication devices 202, 204, and 206 communicate with each other, e.g. to transmit coordination signals 220 and 222 and data 224 and 226, using one of an Institute of Electrical and Electronics Engineers (IEEE) 802.11 wireless communication protocol and a Bluetooth wireless communication protocol, and (b) wireless communication devices 202, 204, and 206 transmit respective portions 214, 216, and 218 of wireless communication signal 212 to wireless base station 210 using one of a long-term evolution (LTE) wireless communication protocol, a fifth-generation (5G) wireless communication protocol, and a sixth-generation (6G) wireless communication protocol. Such use of different communication protocols may enable simultaneous communication among wireless communication devices and communication between wireless communication devices and wireless base station 210. However, in some other embodiments, wireless communication devices 202, 204, and 206 communicate among themselves, and wireless communication devices 202, 204, and 206 communicate with wireless base station 210, using a common wireless communication protocol.

Joint transmission of wireless communication signal 212 consumes resources, such as battery power and processing power, of participating wireless communication devices of local area network 208. Accordingly, in some embodiments, master wireless communication device 202 conditions joint transmission of wireless communication signal 212 on occurrence of one or more predetermined conditions. For example, in some embodiments, master wireless communication device 202 is configured to institute transmission of wireless communication signal 212 in response to any wireless communication device of local area network 208 operating in an emergency mode, such as a wireless communication device attempting to place an emergency phone call (e.g. an E-911 phone call) or send an emergency text message. Joint transmission of an emergency phone call or an emergency text message by the wireless communication devices of local area network 208 may advantageously enable transmission of the phone call or text message to wireless base station 210 in cases where the sending wireless communication device is not capable of reaching wireless base station 210 when operating independently.

Additionally, in some embodiments, one or more wireless communication devices of local area network 208 are configured to condition their participation in joint transmission of wireless communication signal 212 on occurrence of one or more predetermined conditions. For example, in one embodiment, slave wireless communication device 206 is configured to condition its participation in joint transmission of wireless communication signal 212 on a first party providing consideration, such as financial consideration, to a second party associated with slave wireless communication device 206. For example, if the first party wishes to prolong battery life of slave wireless communication device 204 by sending data to wireless base station 210 via a joint wireless transmission, the first party may provide financial consideration to the second party, so that slave wireless communication device 206 participates in joint wireless transmission.

FIG. 8 is a block diagram of a master wireless communication device 800, which is one possible embodiment of master wireless communication device 202. Master wireless communication device 800 includes a cellular subsystem 802, a local area subsystem 804, and a clock 806. Cellular subsystem 802 enables master wireless communication device 800 to communicate with wireless base station 210 using a cellular communication protocol, such as a LTE wireless communication protocol, a 5G wireless communication protocol, or a 6G wireless communication protocol. In some embodiments, cellular subsystem 802 includes a radio transceiver (not shown), an antenna (not shown), and a controller (not shown). Local area subsystem 804 enables master wireless communication device 800 to communicate with other wireless communication devices, such as using an IEEE 802.11 wireless communication protocol or a Bluetooth wireless communication protocol. In some embodiments, local area subsystem 804 includes a radio transceiver (not shown), an antenna (not shown), and a controller (not shown). Clock 806 is used to synchronize operations of master wireless communication device 800 with other elements of system 200.

Master wireless communication device 800 optionally further includes a steering matrix calculation module 808 which determines, for example, coordination signals 220 and 222 based in part on location data 810. Location data 810 includes actual or relative locations of wireless communication devices in local area network 208. Steering matrix calculation module 808 is embodied, for example, by a processor (not shown) executing instructions in the form of software and/or firmware and stored in memory (not shown), of master wireless communication device 800. Master wireless communication device 800 optionally further includes a GPS subsystem 812 and an E-911 protocol 814. GPS subsystem 812 is used, for example, to set clock 806 and/or to determine location of master wireless communication device 800. E-911 protocol 814 is used, for example, to institute joint transmission of a wireless communication signal in response to a wireless communication device of local area network 208 operating in an emergency mode.

FIG. 9 is a block diagram of a slave wireless communication device 900, which is one possible embodiment of slave wireless communication device 204 or 206. Slave wireless communication device 900 includes a cellular subsystem 902, a local area subsystem 904, and a clock 906, which are analogous to cellular subsystem 802, local area subsystem 804, and clock 806, respectively. Slave wireless communication device 900 optionally further includes a GPS subsystem 908 which is used, for example, to set clock 906 and/or to determine location of slave wireless communication device 900. Cellular subsystem 902 transmits a portion of wireless communication signal 212, e.g. portion 216 or 218, according to a coordination signal 910, where coordination signal 910 is, for example, an embodiment of coordination signal 220 or 222. Slave wireless communication device 900 receives coordination signal 910 from a master wireless communication device, such as master wireless communication device 800 of FIG. 8.

Referring again to FIG. 2, in some embodiments, master/slave designations in local area network 208 are static, e.g. they are set during configuration of local area network 208. In some other embodiments, master/slave designations of wireless communication devices in local area network 208 are dynamic, such as discussed below with respect to FIG. 12.

FIG. 10-13 illustrate respective examples of operation of the new wireless communication systems disclosed herein. However, the wireless communication systems disclosed herein are not limited to operating according to FIGS. 10-13. Additionally, the methods of FIGS. 10-13 could be used with other wireless communication systems without departing from the scope hereof.

Figure 10:
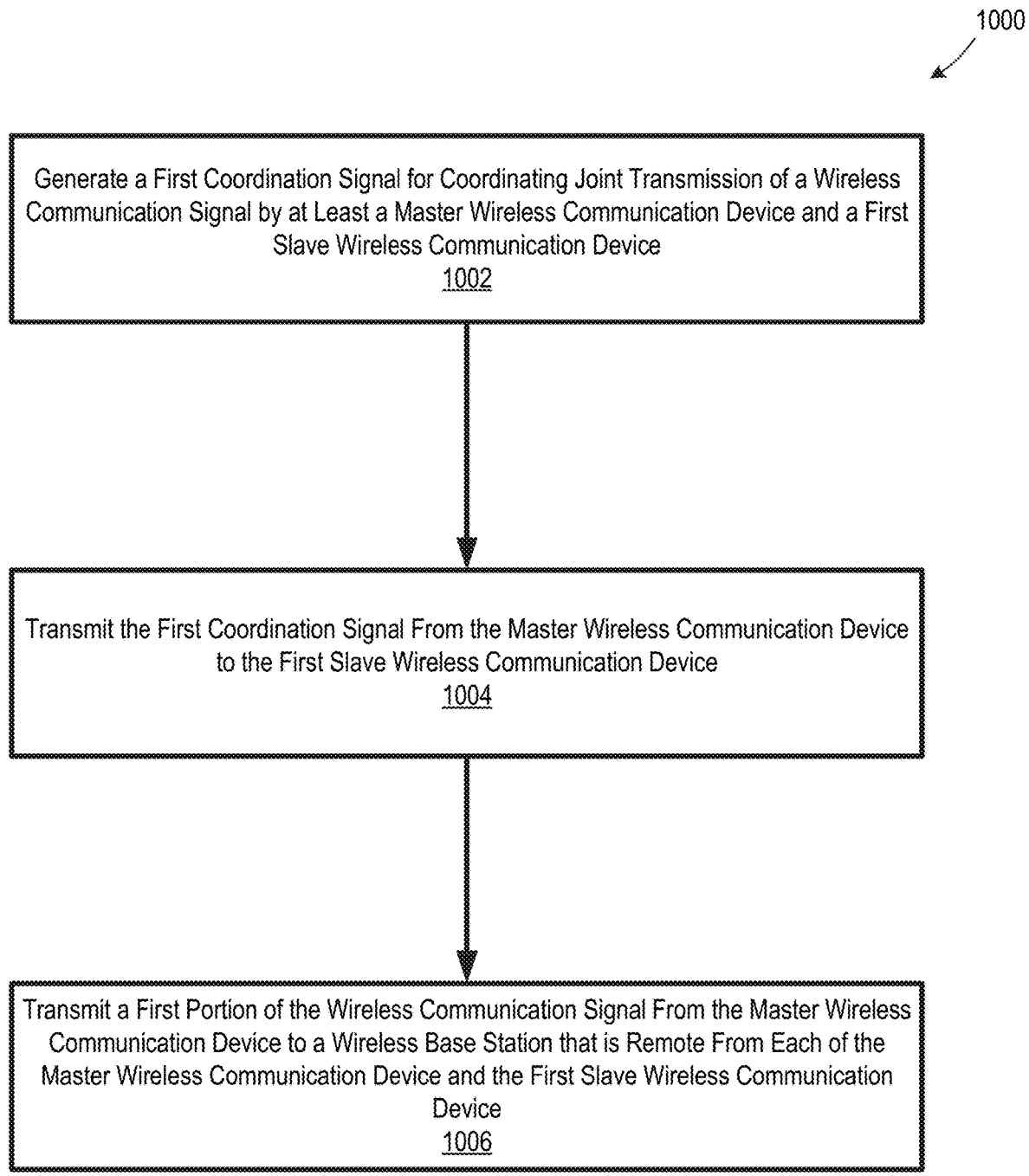
FIG. 10 is a flow chart illustrating a method for joint wireless transmission, according to an embodiment.

FIG. 10 is a flow chart illustrating a method 1000 for joint wireless transmission. In a block 1002 of method 1000, a first coordination signal is generated at a master wireless communication device, where the first coordination signal is for coordinating joint transmission of a wireless communication signal by at least the master wireless communication device and a first slave wireless communication device. In one example of block 1002, master wireless communication device 202 generates coordination signal 220, and in another example of block 1002, master wireless communication device 202 generates coordination signal 222.

In a block 1004 of method 1000, the first coordination signal is transmitted from the master wireless communication device to the first slave wireless communication device. In one example of block 1004, master wireless communication device 202 transmits coordination signal 220 to slave wireless communication device 204, and in another example of block 1004, master wireless communication device 202 transmits coordination signal 222 to slave wireless communication device 206. In a block 1006 of method 1000, a first portion of the wireless communication signal is transmitted from the master wireless communication device to a wireless base station that is remote from each of the master wireless communication device and the first slave wireless communication device. In one example of block 1006, master wireless communication device 202 transmits first portion 214 of wireless communication signal 212 to wireless base station 210.

Figure 11:
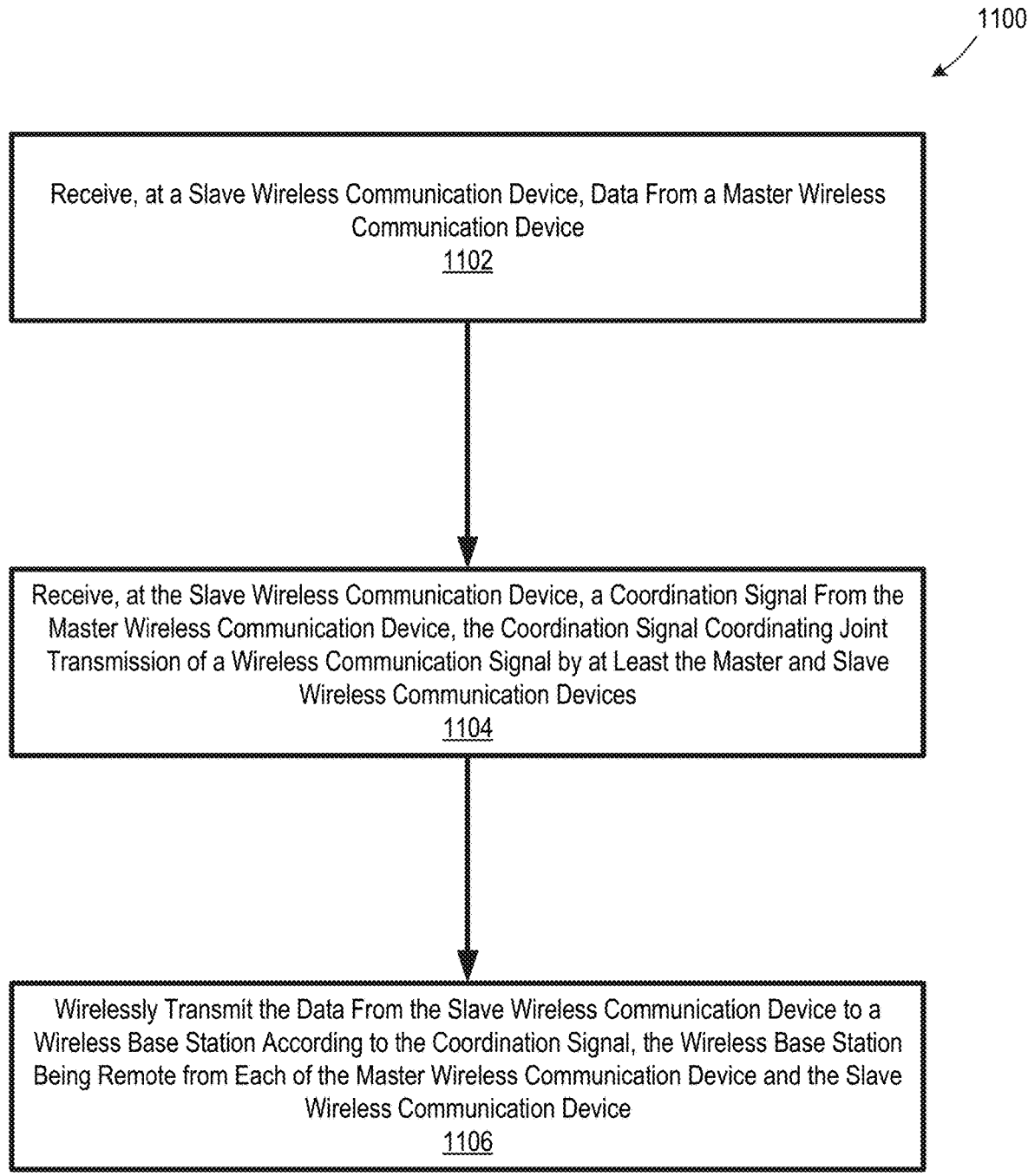
FIG. 11 is a flow chart illustrating another method for joint wireless transmission, according to an embodiment.

FIG. 11 is a flow chart illustrating a method 1100 for joint wireless transmission. In a block 1102 of method 1100, a slave wireless communication device receives data from a master wireless communication device. In one example of block 1102, slave wireless communication device 204 received data 224 from master wireless communication device. In another example of block 1102, slave wireless communication device 206 receives data 226 from master wireless communication device 202. In a block 1104 of method 1100, a coordination signal is received at the slave wireless communication device from the master wireless communication device, where the coordination signal coordinates joint transmission of a wireless communication signal by at least the master and slave wireless communication devices. In one example of block 1104, slave wireless communication device 204 receives coordination signal 220, and in another example of block 1104, slave wireless communication device 206 receives coordination signal 222. In a block 1106 of method 1100, the slave wireless communication device wirelessly transmits the data from the slave wireless communication device to a wireless base station according the coordination signal, where the wireless base station is remote from each of the master wireless communication device and the slave wireless communication device. In one example of block 1106, slave wireless communication device 204 transmits data 224 to wireless base station 210 via second portion 216, according to coordination signal 220. In another example of block 1106, slave wireless communication device 204 transmits data 226 to wireless base station 210 via third portion 218, according to coordination signal 222.

The blocks of method 1100 need not be executed in the order illustrated in FIG. 11. For example, block 1104 could be performed before 1102, or blocks 1102 and 1104 could be simultaneously performed.

Figure 12:
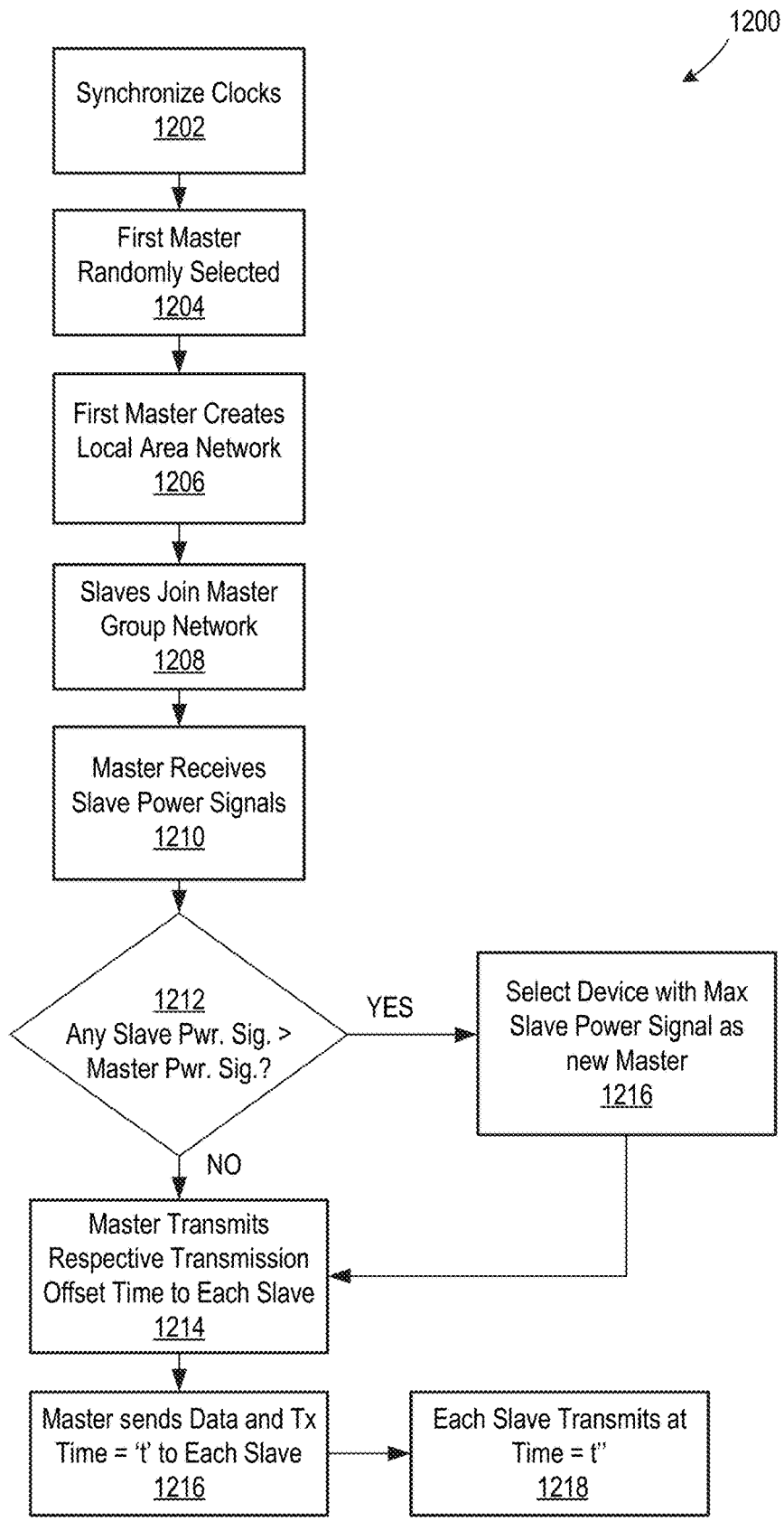
FIG. 12 is a flow chart illustrating another method for joint wireless transmission, according to an embodiment.

FIG. 12 is a flowchart illustrating another method 1200 for joint wireless transmission. In a block 1202 of method 1200, clocks of wireless communication devices are synchronized. In one example of block 1202, clocks of master wireless communication device 202 and slave wireless communication devices 204 and 206 are synchronized, such as according to a GPS signal, by a signal provided by master wireless communication device 202, or by a signal generated by wireless base station 210. In a block 1204 of method 1200, a first master wireless communication device is randomly selected. In one example of block 1204, wireless communication device 202 is randomly selected as a first master wireless communication device. In a block 1206 of method 1200, the first master wireless communication device creates a local area network. In one example of block 1206, master wireless communication device 202 creates local area network 208.

In a block 1208 of method 1200, slave wireless communication devices join the local area network created in block 1206. In one example of block 1208, slave wireless communication devices 204 and 206 join local area network 208. In a block 1210 of method 1200, the first master wireless communication device receives a respective slave power signal from each slave wireless communication device, where each slave power signal represents power of wireless communication signals received by the slave wireless communication device from a wireless base station. In one example of block 1210, master wireless communication device 206 receives a respective slave power signal from each of slave wireless communication devices 204 and 206, where each slave power signal represents power of wireless communication signals received by the slave wireless communication device from wireless base station 210.

In a decision block 1212, the first master wireless communication device determines whether each slave power signal is greater than the master power signal, where the master power signal represents power of wireless communication signals received by the first master wireless communication device from the wireless base station. In one example of decision block 1212, master wireless communication device 202 compares a master power signal of master wireless communication device 202 to respective slave power signals of slave wireless communication devices 204 and 206. If no slave power signal is greater than the master power signal, the first master wireless communication devices remains the master wireless communication device, and method 1200 proceeds to a block 1214. If one or more slave power signals are greater than the master power signal, method 1200 proceeds to block 1216, where the slave wireless communication device having a maximum slave power signal is selected as a new master wireless communication device, and the first master wireless communication device accordingly transmits a signal to the slave wireless communication device commanding the slave wireless communication device to become the new mater wireless communication device. In one example of block 1216, slave wireless communication device 206 is designated as a new master wireless communication device for having a slave power signal that is greater than (a) a master power signal of master wireless communication device 202 and (b) a slave power signal of slave wireless communication device 1204. Method 1200 proceeds from block 1216 to block 1214.

In a block 1214 of method 1200, the master wireless communication device 1200 transmits a respective transmission offset time to each slave wireless communication device, where the transmission offset time specifies a difference between transmission times of two wireless communication devices. In one example of block 1214, master wireless communication device 202 transmits transmission offset time 510 to slave wireless communication device 204 via coordination signal 220. In another example of block 1214, master wireless communication device 202 transmits transmission offset time 610 to slave wireless communication device 204 via coordination signal 222.

In a block 1216 of method 1200, the master wireless communication device sends data and a transmit (Tx) time "t" to each slave wireless communication device. In one example of block 1216, master wireless communication device 202 sends data 224 and transmit time 228 to slave wireless communication device 204, and in another example of block 1216, master wireless communication device 202 sends data 226 and transmit time 228 to slave wireless communication device 206. In a block 1218, each slave wireless communication device transmits its respective data at time t, as adjusted according to the respective transmission offset time of block 1214. In one example of block 1218, slave wireless communication device 204 transmits data 224 to wireless base station 210 via second portion 216 at time 228, as adjusted according to transmission offset time 510 of coordination signal 220. In another example of block 1218, slave wireless communication device 206 transmits data 226 to wireless base station 210 via third portion 218 at time 228, as adjusted according to transmission offset time 610 of coordination signal 222.

Figure 13:
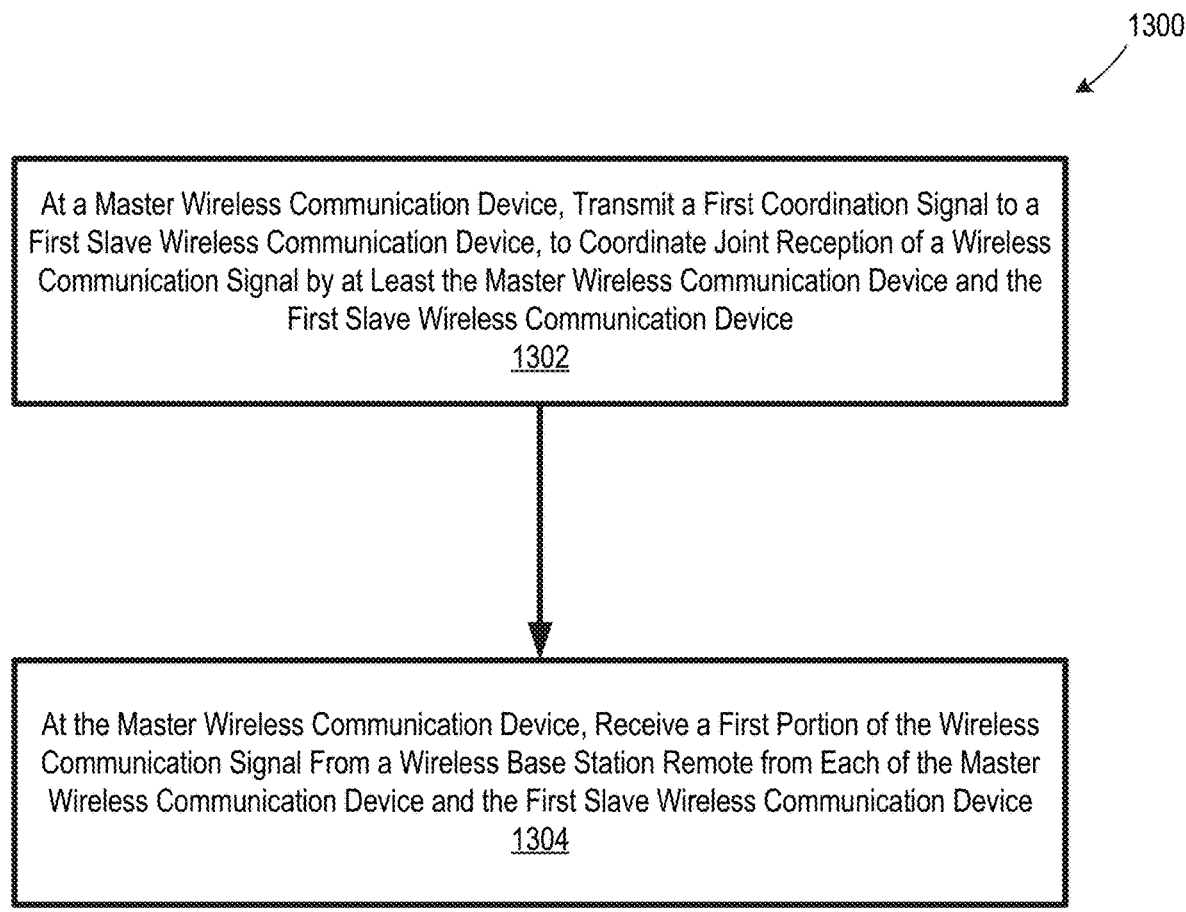
FIG. 13 is a flow chart illustrating a method for joint wireless reception, according to an embodiment.

FIG. 13 is a flow chart illustrating a method 1300 for joint wireless reception. In a block 1302 of method 1300, a first coordination signal is transmitted from a master wireless communication device to a first slave wireless communication device, to coordinate joint reception of a wireless communication signal by at least the master wireless communication device and the first slave wireless communication device. In one example of block 1302, master wireless communication device 202 transmits a coordination signal 720 to slave wireless communication device 204, and in another example of block 1302, master wireless communication device 202 transmits a coordination signal 722 to slave wireless communication device 206. In a block 1304 of method 1300, the master wireless communication device 202 receives a first portion of the wireless communication signal from a wireless base station remote from each of the master wireless communication device and the first slave wireless communication device. In one example of block 1304, master wireless base station 202 receives first portion 714 of wireless communication signal 712, from wireless base station 210.

Combinations of Features

Features described above may be combined in various ways without departing from the scope hereof. The following examples illustrate some possible combinations:

(A1) A method for joint wireless transmission may include (1) at a master wireless communication device, generating a first coordination signal for coordinating joint transmission of a wireless communication signal by at least the master wireless communication device and a first slave wireless communication device, (2) transmitting the first coordination signal from the master wireless communication device to the first slave wireless communication device, and (3) transmitting a first portion of the wireless communication signal from the master wireless communication device to a wireless base station that is remote from each of the master wireless communication device and the first slave wireless communication device.

(A2) The method denoted as (A1) may further include generating the first coordination signal at the master wireless communication device such that the first portion of the wireless communication signal and a second portion of the wireless communication signal constructively interfere with each other at an intended receiver, the second portion of the wireless communication signal being for transmission from the first slave wireless communication device to the wireless base station.

(A3) Any one of the methods denoted as (A1) and (A2) may further include, at the master wireless communication device, (1) determining one or more parameters associated with a second portion of the wireless communication signal based at least partially on a location of the first slave wireless communication device, the second portion of the wireless communication signal being for transmission from the first slave wireless communication device to the wireless base station, and (2) generating the first coordination signal such that the first coordination signal specifies the one or more parameters associated with the second portion of the wireless communication signal.

(A4) In the method denoted as (A3), determining the one or more parameters associated with the second portion of the wireless communication signal may include determining the one or more parameters at least partially using a steering matrix.

(A5) In any one of the methods denoted as (A3) and (A4), the one or more parameters associated with the second portion of the wireless communication signal may include at least one of a phase of the second portion of the wireless communication signal, an amplitude of the second portion of the wireless communication signal, and a transmission offset time.

(A6) Any one of the methods denoted as (A1) through (A5) may further include (1) transmitting first data from the master wireless communication device to the wireless base station via the first portion of the wireless communication signal and (2) transmitting second data from the master wireless communication device to the first slave wireless communication device, for the first slave wireless communication device to transmit to the wireless base station via a second portion of the wireless communication signal.

(A7) The method denoted as (A6) may further include transmitting the second portion of the wireless communication signal from the first slave wireless communication device to the wireless base station, in accordance with the first coordination signal.

(A8) Any one of the methods denoted as (A1) through (A7) may further include transmitting a synchronization signal from the master wireless communication device to the first slave wireless communication device, to coordinate a clock of the first slave wireless communication device with a clock of the master wireless communication device.

(A9) Any one of the methods denoted as (A1) through (A8) may further include (1) receiving, at the master wireless communication device, a slave power signal representing power of wireless communication signals received by the first slave wireless communication device from the wireless base station, (2) determining, at the master wireless communication device, that the slave power signal is greater than a master power signal, the master power signal representing power of wireless communication signals received by the master wireless communication device from the wireless base station, and (3) in response to determining that the slave power signal is greater than the master power signal, transmitting a signal from the master wireless communication device to the first slave wireless communication device commanding the first slave wireless communication device to become a new master wireless communication device.

(A10) Any one of the methods denoted as (A1) through (A9) may further include
  (1) transmitting the first coordination signal from the master wireless communication device to the first slave wireless communication device using a first wireless communication protocol and (2) transmitting the first portion of the wireless communication signal from the master wireless communication device to the wireless base station using a second wireless communication protocol that is different from the first wireless communication protocol.

(A11) In the method denoted as (A10), (1) the first wireless communication protocol may be one of an Institute of Electrical and Electronics Engineers (IEEE) 802.11 wireless communication protocol and a Bluetooth wireless communication protocol and (2) the second wireless communication protocol may be one of a long-term evolution (LTE) wireless communication protocol, a fifth-generation (5G) wireless communication protocol, and a sixth-generation (6G) wireless communication protocol.

(A12) Any one of the methods denoted as (A1) through (A11) may further include transmitting a second coordination signal from the master wireless communication device to a second slave wireless communication device, to coordinate joint transmission of the wireless communication signal by at least the master wireless communication device, the first slave wireless communication device, and the second wireless communication device.

(A13) The method denoted as (A12) may further include generating the first and second coordination signals at the master wireless communication device such that the first portion of the wireless communication signal, a second portion of the wireless communication signal, and a third portion of the wireless communication signal constructively interfere with each other at an intended receiver, the second portion of the wireless communication signal being for transmission from the first slave wireless communication device to the wireless base station, and the third portion of the wireless communication signal being for transmission from the second slave wireless communication device to the wireless base station.

(B1) A method for joint wireless transmission may include (1) receiving, at a slave wireless communication device, data from a master wireless communication device, (2) receiving, at the slave wireless communication device, a coordination signal from the master wireless communication device, the coordination signal coordinating joint transmission of a wireless communication signal by at least the master and slave wireless communication devices, and (3) wirelessly transmitting the data from the slave wireless communication device to a wireless base station according to the coordination signal, the wireless base station being remote from each of the master wireless communication device and the slave wireless communication device.

(B2) The method denoted as (B1) may further include (1) receiving, at the slave wireless communication device, a synchronization signal from the master wireless communication device, and (2) setting a clock of the slave wireless communication device according to the synchronization signal.

(B3) The method denoted as (B1) may further include setting a clock of the slave wireless communication device according to a global navigation satellite system (GNSS) clock.

(C1) A method for joint wireless reception may include (1) at a master wireless communication device, transmitting a first coordination signal to a first slave wireless communication device, to coordinate joint reception of a wireless communication signal by at least the master wireless communication device and the first slave wireless communication device, and (2) at the master wireless communication device, receiving a first portion of the wireless communication signal from a wireless base station remote from each of the master wireless communication device and the first slave wireless communication device.

(C2) The method denoted as (C1) may further include generating the first coordination signal at the master wireless communication device such that the first slave wireless communication device receives a second portion of the wireless communication signal from the wireless base station.

(C3) The method denoted as (C2) may further include receiving, at the master wireless communication device from the slave wireless communication device, data being associated with the second portion of the wireless communication signal (C4) In any one of the methods denoted as (C1) through (C3), the first coordination signal may specify an antenna characteristic of the first slave wireless communication device.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for joint wireless transmission, comprising:
at a primary wireless communication device, generating a first coordination signal at least partially based on a location of a first secondary wireless communication device, the first coordination signal for coordinating joint transmission of a wireless communication signal by at least the primary wireless communication device and the first secondary wireless communication device;
transmitting the first coordination signal from the primary wireless communication device to the first secondary wireless communication device;
transmitting a first portion of the wireless communication signal from the primary wireless communication device to a wireless base station that is remote from each of the primary wireless communication device and the first secondary wireless communication device; and
at the primary wireless communication device:
determining one or more parameters associated with a second portion of the wireless communication signal based at least partially on the location of the first secondary wireless communication device, the second portion of the wireless communication signal being for transmission from the first secondary wireless communication device to the wireless base station, and
generating the first coordination signal such that the first coordination signal specifies the one or more parameters associated with the second portion of the wireless communication signal.

2. The method of claim 1, further comprising generating the first coordination signal at the primary wireless communication device such that the first portion of the wireless communication signal and the second portion of the wireless communication signal constructively interfere with each other at an intended receiver.

3. The method of claim 1, wherein determining the one or more parameters associated with the second portion of the wireless communication signal comprises determining the one or more parameters at least partially using a steering matrix.

4. The method of claim 1, wherein the one or more parameters associated with the second portion of the wireless communication signal comprise at least one of a phase of the second portion of the wireless communication signal, an amplitude of the second portion of the wireless communication signal, and a transmission offset time.

5. The method of claim 1, further comprising:
transmitting first data from the primary wireless communication device to the wireless base station via the first portion of the wireless communication signal; and
transmitting second data from the primary wireless communication device to the first secondary wireless communication device, for the first secondary wireless communication device to transmit to the wireless base station via the second portion of the wireless communication signal.

6. The method of claim 5, further comprising transmitting the second portion of the wireless communication signal from the first secondary wireless communication device to the wireless base station, in accordance with the first coordination signal.

7. The method of claim 1, further comprising transmitting a synchronization signal from the primary wireless communication device to the first secondary wireless communication device, to coordinate a clock of the first secondary wireless communication device with a clock of the primary wireless communication device.

8. A method for joint wireless transmission, comprising:
at a primary wireless communication device, generating a first coordination signal at least partially based on a location of a first secondary wireless communication device, the first coordination signal for coordinating joint transmission of a wireless communication signal by at least the primary wireless communication device and the first secondary wireless communication device;
transmitting the first coordination signal from the primary wireless communication device to the first secondary wireless communication device;
transmitting a first portion of the wireless communication signal from the primary wireless communication device to a wireless base station that is remote from each of the primary wireless communication device and the first secondary wireless communication device;

receiving, at the primary wireless communication device, a secondary power signal representing power of wireless communication signals received by the first secondary wireless communication device from the wireless base station;

determining, at the primary wireless communication device, that the secondary power signal is greater than a primary power signal, the primary power signal representing power of wireless communication signals received by the primary wireless communication device from the wireless base station; and in response to determining that the secondary power signal is greater than the primary power signal, transmitting a signal from the primary wireless communication device to the first secondary wireless communication device commanding the first secondary wireless communication device to become a new primary wireless communication device.

9. The method of claim 1, further comprising:

transmitting the first coordination signal from the primary wireless communication device to the first secondary wireless communication device using a first wireless communication protocol; and transmitting the first portion of the wireless communication signal from the primary wireless communication device to the wireless base station using a second wireless communication protocol that is different from the first wireless communication protocol.

10. The method of claim 9, wherein:

the first wireless communication protocol is one of an Institute of Electrical and Electronics Engineers (IEEE) 802.11 wireless communication protocol and a Bluetooth wireless communication protocol; and the second wireless communication protocol is one of a long-term evolution (LTE) wireless communication protocol, a fifth-generation (5G) wireless communication protocol, and a sixth-generation (6G) wireless communication protocol.

11. The method of claim 1, further comprising transmitting a second coordination signal from the primary wireless communication device to a second secondary wireless communication device, to coordinate joint transmission of the wireless communication signal by at least the primary wireless communication device, the first secondary wireless communication device, and the second secondary wireless communication device.

12. The method of claim 11, further comprising generating the first and second coordination signals at the primary wireless communication device such that the first portion of the wireless communication signal, the second portion of the wireless communication signal, and a third portion of the wireless communication signal constructively interfere with each other at an intended receiver, the third portion of the wireless communication signal being for transmission from the second secondary wireless communication device to the wireless base station.

* * * * *